(12) United States Patent
Dieterich et al.

(10) Patent No.: US 7,386,078 B2
(45) Date of Patent: Jun. 10, 2008

(54) ADAPTIVE FILTERING METHOD AND FILTER FOR FILTERING A RADIO SIGNAL IN A MOBILE RADIO-COMMUNICATION SYSTEM

(75) Inventors: Hans Dieterich, Ulm (DE); Björn Jelonnek, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 1020 days.

(21) Appl. No.: 10/487,432

(22) PCT Filed: Aug. 19, 2002

(86) PCT No.: PCT/EP02/09262

§ 371 (c)(1),
(2), (4) Date: Feb. 23, 2004

(87) PCT Pub. No.: WO03/019802

PCT Pub. Date: Mar. 6, 2003

(65) Prior Publication Data

US 2004/0233886 A1  Nov. 25, 2004

(30) Foreign Application Priority Data

Aug. 23, 2001 (DE) .................... 101 41 394
Aug. 23, 2001 (EP) .................... 01120253

(51) Int. Cl.
*H04B 1/10* (2006.01)
(52) U.S. Cl. .................... 375/350
(58) Field of Classification Search ........ 375/232, 375/271, 274, 278, 336, 350; 455/501, 63.1
See application file for complete search history.

(56) References Cited

U.S. PATENT DOCUMENTS

| 4,206,317 | A | 6/1980 | Kahn |
|---|---|---|---|
| 5,287,556 | A | 2/1994 | Cahill |
| 5,339,463 | A | 8/1994 | Hansen |
| 5,351,274 | A | 9/1994 | Chennakeshu et al. |
| 6,047,171 | A | 4/2000 | Khayrallah et al. |
| 6,134,265 | A | 10/2000 | Long |
| 6,178,211 | B1 | 1/2001 | Whikehart et al. |
| 2003/0021367 | A1* | 1/2003 | Smith .................... 375/346 |
| 2004/0120535 | A1* | 6/2004 | Woods .................... 381/96 |

FOREIGN PATENT DOCUMENTS

| DE | 2803979 | 9/1988 |
|---|---|---|
| DE | 3818748 | 12/1989 |
| DE | 4429525 | 3/1995 |

(Continued)

*Primary Examiner*—Don N Vo
(74) *Attorney, Agent, or Firm*—Staas & Halsey LLP

(57) ABSTRACT

A radio signal in a radio communication system may be filtered to prepare an EDGE-signal. In this case, the signal-to-noise-ratios are calculated according to a first operation in addition to previously known methods for detecting a neighboring channel interference. In addition, other variously tuned filters are activated when a corresponding threshold is reached, where the thresholds are associated with correspondingly intense interferences from neighboring channel influences. A filtering method or filter module can be mounted in an existing station behind an existing receiving filter. In the first filtering operation, the previous filter effect is reduced to the smallest amount possible before new filtering is carried out to produce a desired signal. The EDGE signals can also be produced in a simple manner from GMSK signals.

14 Claims, 2 Drawing Sheets

| | FOREIGN PATENT DOCUMENTS | | EP | 1005021 | 5/2000 |
|---|---|---|---|---|---|
| DE | 4192408 | 9/1997 | WO | 00/72454 | 11/2000 |
| DE | 100552719 | 5/2002 | | | |
| EP | 0722226 | 7/1996 | * cited by examiner | | |

ADAPTIVE FILTERING METHOD AND FILTER FOR FILTERING A RADIO SIGNAL IN A MOBILE RADIO-COMMUNICATION SYSTEM

CROSS REFERENCE TO RELATED APPLICATIONS

This application is based on and hereby claims priority to German Application No. 10141394.7 filed on Aug. 23, 2001 and European Application No. 01120253.8 filed on Aug. 23, 2001, the contents of which are hereby incorporated by reference.

BACKGROUND OF THE INVENTION

In cellular mobile radio system that currently exist, for example as per the GSM (Global System for Mobile Communications) standard, one or more network-side base stations communicate with stationary or mobile subscriber-side stations via radio interfaces. To enable larger geographical areas to be covered with a limited frequency bandwidth, these types of mobile radio systems are as a rule of cellular design.

Each radio cell in this case is assigned at least one radio channel, in which case each of the radio channels in its turn is assigned a restricted frequency range of the overall frequency bandwidth available. In this case the radio channels of adjacent radio cells are not used as a rule in a radio cell, to avoid mutual interference. Since however the radio field attenuation in this type of radio system is restricted faults or interference are triggered in each radio cell especially by the radio channels of the immediately adjacent radio cells. This particularly effects the boundary area in each case between the two adjacent radio cells, this occurring especially when the frequency band of the radio channel of the one radio cell is directly adjacent to the frequency band of the radio channel of the other adjoining radio cell. This type of interference is known as adjacent channel interference. The adjacent channel signal-to noise-ratio, that is the ratio between the signal power and the noise power of adjacent channels, significantly influences the spectral efficiency of a radio system.

In mobile radio receivers the received mobile radio signal is normally fed to a receive filter for filtering. As can be seen from FIG. 3 the effect of such a receive filter primarily depends on the spectral location and the power density S(f) of the adjacent channel interference. Thus, in the example shown in FIG. 3, even after receive filtering the lower end area 18 marked in black as well as in the upper cross-hatched end area 19 of the frequency spectrum of radio channel no. 1 adjacent channel interference occurs as a result of radio channels no. 0 or no. 2 of the adjacent radio cells. Whereas the adjacent channel interference remaining in the lower end area 18 is negligible, the adjacent channel interference remaining in the upper end area 19 is still relatively strong. By contrast to FIG. 3 real receive filters basically do not possess an infinite rate of change which increases even further the interference effect of the adjacent channels.

Receive filters can however not be dimensioned in such a way that on the one hand they suppress severe adjacent channel faults and thereby improve the bit error rate, but on the other hand, if adjacent channel faults do not occur they do not make the bit error rate worse. A receive filter which is optimized for both cases cannot be dimensioned.

A method for filtering a mobile radio signal is known from WO 00/72454 A1 in which a mobile radio signal received over a mobile radio channel is filtered before being processed further, in which case the received mobile radio signal is analyzed with regard to the occurrence of adjacent channel interference and if the presence of adjacent channel interference is established in the received mobile radio signal, this is selectively filtered before further processing to suppress the adjacent channel interference. Analysis in this case is preferably undertaken in bursts with the frequency spectrum of the individual bursts being analysed. In particular the energy contained in the upper end of the frequency spectrum of a burst and the energy contained at the lower end of the frequency spectrum of a burst are determined and compared with each other so that for a defined deviation between the energies determined in this way conclusions can be drawn about the presence of adjacent channel interference. The mobile radio signal selectively filtered in this way is subsequently fed to an equalizer for further processing.

Currently a new radio interface technology is being introduced for the existing mobile radio system GSM, which will be referred to as EDGE (Enhanced Data Rates for GSM Evolution) or EGPRS (Enhanced General Packet Radio System). This new technology makes high bit rate mobile video and Internet applications possible, in which case the data throughput can currently be increased to up to 384 kbits/s per carrier. In order to achieve this, with EDGE the normal binary GMSK (Gaussian Minimum Shift Keying) used for GSM will be replaced by an eight-value PSK Modulation (PSK:Phase Shift Keying). This type of modulation is in general more sensitive than GMSK modulation to selective receive band filters. To achieve the required receive sensitivities for EDGE in accordance with the GSM specifications currently envisaged, the predominantly fixed selective receive band filtering used thus far is to be replaced by an adaptive filtering. For GMSK this is also a possible option or, the system being described in the previously mentioned WO 00/72454 A1. Also described in this document is a possible methodology for adaptive receive band filtering.

A receiver is known from U.S. Pat. No. 6,178,211 B1 in which a carrier frequency signal is received and converted into a digital intermediate frequency signal. The carrier frequency signal is fed, either before or after digitization, to an "Automatic Gain Control, AGC". With the aid of an adaptive control system a signal level after channel filtering is detected in the intermediate frequency range and compared with a specified threshold. The threshold is selected to depend on the bandwidth of the intermediate frequency range in order to implement as fast switchover or a fast adaptation of the bandwidth with minimal transient effects.

A receiver with two intermediate frequency filters is known from U.S. Pat. No. 6,047,171. In this case one intermediate frequency filter exhibits a narrower bandwidth than the other intermediate frequency filter. A changeover switch is used to switch between the two intermediate frequency filters.

A method of filtering in a receiver is known from EP 0 722 226 A1. In this case an absolute signal strength is determined and on the basis of this the frequency response of a filter is compared in the receiver.

SUMMARY OF THE INVENTION

An object of the present invention is to expand the existing facilities in such a way that a signal can also be suitably prepared for EDGE receivers. Advantageously in the preferred embodiment to be used here there is to be the minimum possible intervention into the existing techniques and methods.

Especially advantageous for determining whether and/or on what side of the frequency spectrum of a radio channel an interfering adjacent channel signal is present is the option of establishing the signal-to-noise ratio and using this information in constructing a filter. Advantageously the determining of the signal-to-noise ratio can be established in this case during a training sequence of a received burst. In particular it is also then possible to filter the signal-to-noise ratio once with a narrow and once with a wide receive band filtering and consider as a criterion for adjacent channel interference the difference of the two signal-to-noise ratios determined in relation to one or more threshold values. Whereas in the case of the adjacent channel energy a large amount of difference occurs, co channel interference and noise type interference, especially Gaussian noise, have barely any effect on signal-to-noise values estimated or determined in this way.

Usefully the dimensioning of an adaptive filter for filtering out interference signals of an adjacent channel can be made dependent in this case on the strength of the interference. As the measure of the strength of the interference, the energy strength of the interfering signals, here adjacent channel interference and/or signal-to-noise ratios can be determined.

Whereas in principle it is possible to determine an individual filter which is applied as from a specified threshold value reached, it is also possible to determine a variably adaptive filter generation for which a separate filter will be created at in each case of a disturbed signal. With a view to a cost effective application however a sensible method is that in which neither a single filter nor an unlimited number of filters are created by determining new filters in each case, but in which a number of threshold values are set to at which in each case a corresponding adapted filter starts to be used for a certain frequency range.

Especially advantageous is a method for filtering a radio signal which, in the receiving station, directs already filtered signals to a specific signal processing in which at least a part of the previous filter effect is reversed by further signal processing. This means that a conventional receive device can be used, for which the functionality has already been checked and ideally which also has market approval, in order to expand such a device for a further functionality. The reversal of the filter effect in this case can be undertaken especially advantageously by an inversion or widening filter. It is possible to use a Gauss-Seidel method to do this for example. Usefully the signal for which a previous filter effect has at least been partly reversed is then fed to a further special filter. Adaptive filtering can be used in particular as a further filter which is undertaken depending on a recorded fault. It will be possible in particular, for example by using a corresponding module, to tap an output signal of a receive filter in a conventional GMSK receiver to provide a conventional GMSK signal. As well as an output to output the previous GMSK signal, the tapped signal can then also be fed to the module or the function for canceling of the previous filter effect, so that subsequently conditioning of the signal using an adaptive receive filter for example is possible in order to finally create an EDGE signal. In this manner the upgrading of an existing receiver is possible in such a way that in future it outputs an EDGE signal or an EDGE and a GMSK signal.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
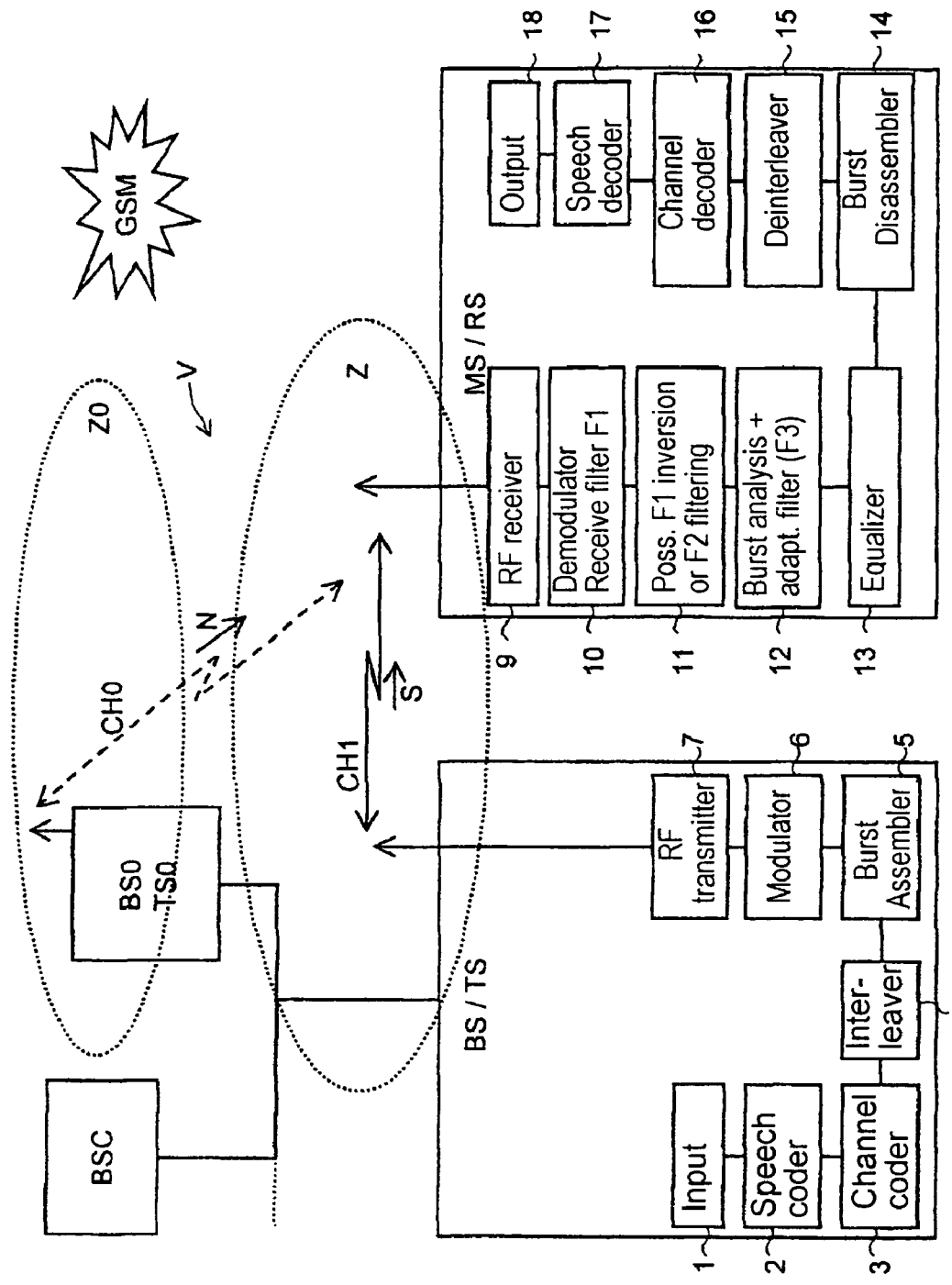
FIG. 1 is a block diagram of individual stations of a radio communications system.

Reference will now be made in detail to the preferred embodiments of the present invention, examples of which are illustrated in the accompanying drawings, wherein like reference numerals refer to like elements throughout.

Figure 3:
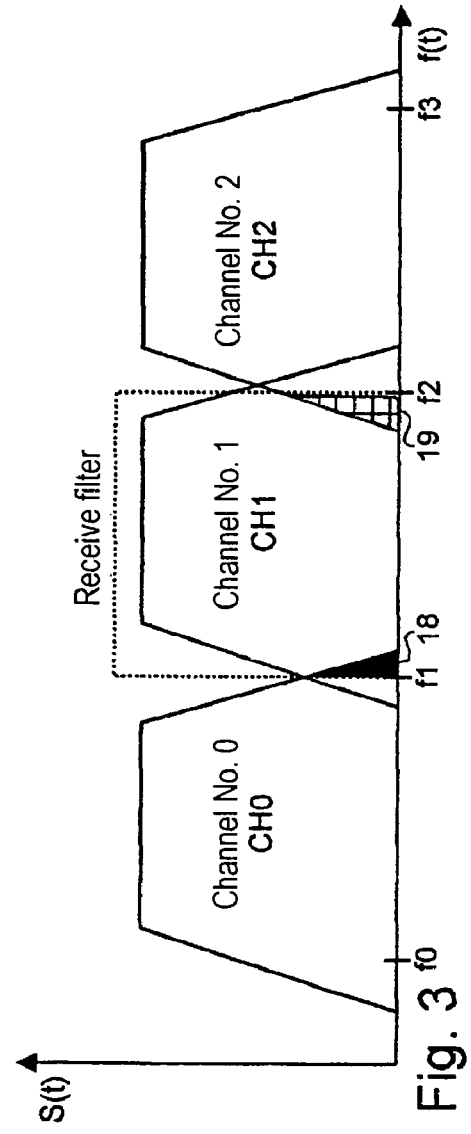
FIG. 3 is a general block diagram to explain adjacent channel interference.

As can be seen from FIG. 1, a communications system, especially a mobile radio communications system, consists of a plurality of devices connected to each other on the network side. To simplify the diagram only a Base Station Controller BSC and two base stations connected to it, BS and BS0, are shown Each of the base stations BS or BS0 forms one or more radio cells Z or Z0, in which case communication connections with stationary or mobile subscriber-side stations MS can be set up within the corresponding radio cells Z. A communications connection in this case is established via the interface, here the radio interface V. The radio interface V, as can be seen from FIG. 3, is subdivided into a plurality of adjacent frequency bands f0-fi, fl-f2, f2-f3, in which case the individual frequency bands f0-fl, fl-f2, f2-f3 are assigned corresponding radio channels CH0, CH1 or CH2. The radio channels CH1, CH0 are assigned within the radio communications system GSM in this case in such a way that for example for radio connections between the base station BS and the radio cell Z to corresponding subscriber-side stations MS the first radio channel CH1 is available, whereas for further base stations BS0 with corresponding radio cells Z0 other radio channels CH0 will be allocated.

As is shown in FIG. 1, the transmitted signals S or the radio connection over the radio channel CH1 between the first base station BS and the subscriber-side station MS are disturbed by signals N on the radio channel CH0 of the adjacent second base station BS0. As can be seen from FIG. 3, the two radio channels shown, CH1 and CH0 are adjacent radio channels so that adjacent channel interference cannot be excluded.

To simplify matters, the description below will now consider an at least temporally transmitting station TS, in the example here this is to be a first base station BS, and a station receiving the sent signals, data or information, in the present exemplary embodiment the subscriber-side mobile station MS. The second base station BS0 will be assumed to be a station sending on the adjacent channel CH0. This simplification is chosen since with transmissions in the other direction from a subscriber-side station MS to a network-side base station BS the same methodology can be applied, in which case the subscriber-side station MS is then the sending station and receiver-side station BS is the base station.

As FIG. 1 shows, both the sending and the receiving station feature a plurality of components and software-based and/or hardware-based modules, of which only some are shown.

On the send side the transmitting station BS or TS features an input device 1 which for example accepts the data transmitted from another station or device. In general this data can originate from different types of application, e.g. the voice data, Internet browser or WAP. The starting point used for the illustration below is a voice transmission. The input device 1 can for example be a microphone of a transmitting station as well here. A speech encoder 2 converts an analog voice signal to be transmitted into a digital bit stream and feeds it to a channel coder 3. The channel coder 3 adds additional redundant bits to the actual user bit, depending on a specific channel coding procedure, which can be evaluated later on the receiver side for detection and/or correction of transmission errors. The output data of the channel coder 3 is fed to an interleaver or scrambler which rearranges their timing in order to create a quasi-memoryless channel. A burst assembler 5 is connected downstream of the interleaver 4 which embeds the data up to be transmitted into a frame structure and feeds it in the form of bursts, i.e. physical channels, to a modulator 6. The modulator 6 modulates the information or data to be transmitted onto a carrier signal which is finally transmitted by a radio frequency transmit section 7 over a radio frequency channel, in this case the radio channel CH1 to the receiving station RS or MS.

The receiving station RS accordingly features a radio-frequency receive section 9, a demodulator with receive band filter (F1) 10, a burst disassembler 14, a deinterleaver 15, a channel decoder 16 and a speech decoder 17, which correspondingly reverse the function of the components or modules of the transmitting station explained above. In an optional add-on device 11 there is provision for an inversion of a receive band filter F1 or for widening filtering F2. This will be explained in more detail below. This is followed by an analysis and filtering device 12 for spectral analysis and signal-to-noise ratio estimation of the receive signal and subsequent selective or adaptive receive filtering F3. Furthermore, with the present exemplary embodiment an equalizer 13 is provided between the analysis and filter device 12 and the burst disassembler 14. The analysis device 12 analyses the bursts received by the receiving station RS and determines whether there is adjacent channel interference in the data received. If adjacent channel interference is established in the frequency spectrum of the analyzed burst, its sampling values which are normally present in a complex digital form coming from the demodulator/receive filter 10 are filtered in order to rectify the adjacent channel interference, whereas if no adjacent channel interference is detected the sample values of the burst are preferably fed unchanged to the downstream equalizer 13 as well as to the subsequent components for further signal processing. The function of the unit 12 will preferably be executed by the digital signal processors provided in cellular mobile stations in accordance with a correspondingly suitable algorithm. Alternatively however hardware components can also perform the corresponding functions.

This recording of the adjacent channel interference can be performed in various different ways, in which case the energy in a narrow frequency band at the lower end as well as at the upper end of the frequency spectrum of the burst to be analyzed is preferably first determined. A comparison of the energies determined in this way, especially creation of a quotient, enables a decision to be made as regards adjacent channel interference since as a rule these value would deviate significantly from the average burst energy and are independent of it. Without adjacent channel interference, in the case of quotient formation, the quotient is equal to 1 in the ideal case so that adjacent channel interference can be recognized by the fact that the quotient value is compared with a range of tolerances around the value 1, i.e. with a lower and an upper limit value. If the quotient value lies outside the range of tolerances, it is concluded that adjacent channel interference is present. In the case of adjacent channel interference, a filter, for example in the form of non—recursive digital FIR low pass filtering (Finite Impulse Response) can be used with a linear phase response, in which case a non-symmetrical filter can make sense.

To determine the energy at the lower and the upper end of the burst spectrum the spectrum of the complex sampling values of the burst can for example be shifted by a value +Of or a value −Of and the shifted burst spectrum subsequently filtered with a lowpass filter again. In this case a recursive digital IIR (Infinite Impulse Response) lowpass filtering is preferably used since in this case the realization effort is lower compared to an FIR filter and in addition the non-linear phase response of IIR lowpass filtering does not cause problems in detection. However there are any number of other methods that can be used to determine the energy or directly adjacent channel interference. Various examples are explained in particular in WO 00/72454 Al.

In accordance with an especially preferred exemplary embodiment, to determine whether and/or on which side of the frequency spectrum and adjacent channel is present, the estimated signal-to-noise ratio (SNR) is used for estimating the energy, in which case this method can be used especially in addition to the methods described here or other methods of estimating energy.

This method of operation would appear advantageous since, especially for EDGE, channel coding schemes with very low redundancy are to be defined. In these an EDGE receiver should not generate any bit errors or generate hardly any before decoding in order to achieve the required receive quality. Detecting whether adjacent channel interference is present or not should thus be very precise, since even with a good signal-to-noise ratios and with too narrow receive band filtering bit errors and thereby decoding errors can arise. A normal pure adjacent channel energy assessment as a detection criterion appears to be too precise as a rule for these purposes since under some circumstances adjacent channel energy is detected or determined although no such energy is present. This is a result of factors such as the spectral characteristics of user data from which a finite number is distributed over a burst and from the characteristics of the transmission channel which is configured as a multi-way channel, in which adjacent channel energy can be simulated by both, user data characteristics and transmission channel characteristics. These types of incorrect detection can be ignored in the case of GMSK because they are more robust in comparison to EDGE receivers.

Especially advantageous is estimation of the signal-to-noise ratio during a training sequence of a received burst, in which case one narrow receive band filtering and one wide receive band filtering are preferably used. This produces two different results for signal-to-noise ratios SNR1 or SNR2. If in this case greatly differing signal-to-noise ratio values SNR1 or SNR2 are produced it can be concluded with relative certainty that adjacent channel energy is present, e.g. if SNR1-SNR2>TR with TR being the threshold value set. Co-channel interference and noise-type interference by contrast will barely be perceptible in the results of the narrow and the wide receive band filtering to determine the signal-to-noise ratio in the values SNR1 or SNR2. As already explained, this method of determining adjacent channel interference can advantageously be used with existing and further procedures to determine interference frequency effects, energies etc.

In accordance with a further advantageous embodiment which can also be combined with the previously mentioned procedures as well as the embodiments described here, the subsequent receive band filtering can advantageously be performed adaptively depending on the relevant current strength of the adjacent channel energy or adjacent channel interference. With strong interference by the adjacent channel CH0 here for example there is correspondingly greater filtering than for weaker interference. This relationship can be implemented and taken into account by any functions.

In particular it is possible to fix a threshold TR which is compared with the strength of the interference, in which case above the threshold TR greater filtering is undertaken than below the threshold TR or for example there is only filtering above the threshold TR, with no filtering below the threshold. This methodology can also be used advantageously for example for creating a GMSK signal.

However, especially for creating an EDGE signal, it is advantageous to undertake a more precise graduation, which can for example be done by defining a plurality of thresholds TR with assigned interference values. Furthermore the corresponding filters will be assigned to the various thresholds with different bandwidths and or different steepnesses of the rising edge of the filter signal. This allows different bandwidths of the frequency bands and steepnesses of the filter flanks to be taken into consideration.

Especial effort is required, but in principle it is also advantageous to determine a separate filter characteristic in each case and the corresponding programming of a filter for the instantaneously required circumstances at the radio interface V in each case.

In accordance with an especially preferred embodiment adaptive receive band filtering F3 will be performed in a receiver for which the actual receive band filtering F1 is designed for a narrower bandwidth, for example the bandwidth in accordance with GSM. A corresponding conversion can be undertaken by software-based or hardware based modules, in which case a particularly preferred embodiment features the layout in FIG. 2.

A receive filter F1 already implemented in the receiving station RS should be designed in the exemplary embodiment shown for existing GMSK receive stations. Signals output by this receive filter F1 correspond here to the previous GMSK signals.

Figure 2:
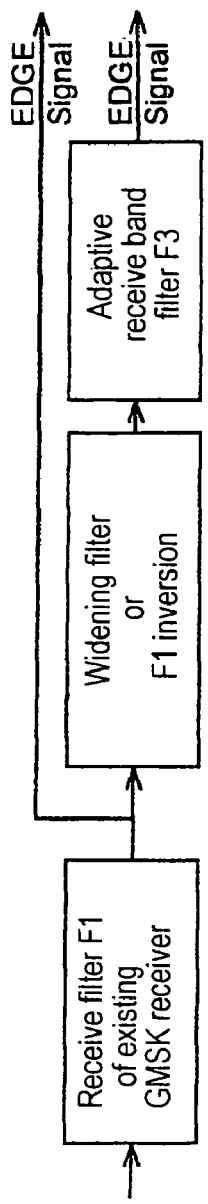
FIG. 2 is a block diagram of components or modules in a receive station.

To create another type of signal, in the example here an EDGE signal, a further module is provided, in which case the output signal of the receive filter F1 is used as the receive signal for the additional module. This is possible by directly connecting the output of the receive filter F1 to the input of the additional filter F2, F3, but also possible is the tapping off of an output signal line, as shown in FIG. 2.

In the additional filter, in a first module, especially a widening filter F2 or an F1 inversion device, the filter effect of the receive filter F1 is reversed entirely or partly or cancelled, in which case alias and build or programming effects are to be taken into account.

The output signal of the widening filter F2 or the inversion device is then fed to a further receive band filter F3 which is preferably embodied as an adaptive filter F3 and from the input signal creates a desired signal, here a desired EDGE signal.

Such a layout offers the particular advantage that, when used in the previous GSM system, previous GSM receiver stations or their receivers can be used almost unchanged for GMSK signal processing. EDGE signals can be created by adding a separate or additional processing chain. In particular the layout allows already tested and accepted receivers to be used so that only the functions of the additional module have to be tested and accepted. Advantageously there is no need to construct, test and accept new shared preprocessing steps or modules.

Figure 4:
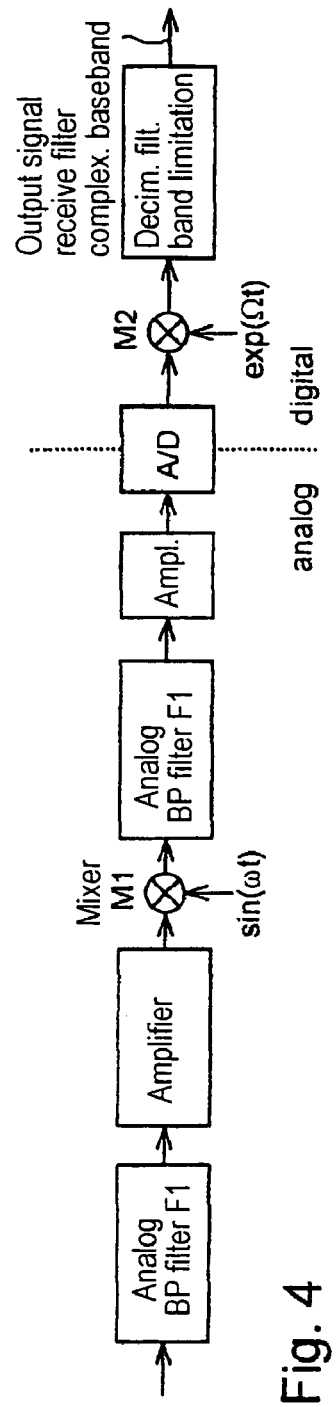
FIG. 4 is a graph of a filter arrangement to explain the basic principle of a receiver.

On the basis of FIG. 4 the fundamental principle of a receiver or receive module is described in a schematic diagram. The incoming signal, for example a GMSK or an EDGE signal, is present within the bandpass range. First, its bandwidth is limited by a bandpass filter BP, then it is amplified in an amplifier V and transferred by an analog mixer M1 into an intermediate frequency ZF. The mixing in mixer M1 is a typically indicated here by a multiplication with $\sin(\omega t)$. With older receive concepts a further intermediate frequency can be created and used with a further analog bandpass filter, mixer and amplifier, but no further consideration is given to this here. After the bandpass filter the signal, optionally amplified, is digitized by an analog/digital converter. Afterwards, the signal is converted by a digital mixing process in a mixer M2 into the complex baseband, the sampling rate is estimated and signal S is limited to the bandwidth of GMSK.

Apart from exclusively implementation- linked none-linear distortions, this involves a linear transformation of the received antenna signal into the complex baseband. All filters of the receiver chain can then be combined into a frequency response which is implemented here by the receive filter F1.

This receive filter F1 is an equivalent digital filter with an available bandwidth corresponding to the selected sampling rate. To increase this bandwidth, either a widening filter F2 can be used or an inversion by a numerical procedure, for example a Gauss-Seidel procedure can be employed.

A filter with an inverse frequency response to the receive filter F1 can be determined by a number of methods, for example a Fourier transformation of the output signal/the filter characteristics of the receive filter F1, or by an inverse Fourier transformation and time windowing in the time range. Another approach consists of calculating and inverse filter in the sense of the minimal error square, in which case a linear equation system is initiated. Regardless of how the inverse filter is calculated, because of the lowpass behavior of receive filter F1 it exhibits highpass filter behavior.

The inverse filter calculated in this way can advantageously be used directly as a widening filter F2. If they pass through a range which is just slightly wider than that of the receive filter F1 used, a lowpass filter, especially with the desired frequency response, can be folded with the inverse filter and optionally time windowed to obtain a bandpass filter design for the widening filter F2.

Alternatively numerical procedures can be used for calculating the widening filter F2 from the receive filter F1. With these procedures the widening filter F2 is adjusted and such a way that the output signal of its widening filter F2 is the optimum possible in the sense of a target function. A target function of this type can for example be that, in the sense of the minimal error square the output signal of the widening filter F2 matches the transmitted data sequence of an EDGE signal as well as possible. This optimization can be initiated iteratively for example with a Gauss-Seidel procedure.

The invention has been described in detail with particular reference to preferred embodiments thereof and examples, but it will be understood that variations and modifications can be effected within the spirit and scope of the invention.

The invention claimed is:

1. A method for filtering a radio signal in a radio communication system with at least one temporarily transmitting station and at least one receiving station which communicate with each other at corresponding times via a radio interface having a plurality of radio channels and a radio spectrum, each radio channel having a restricted bandwidth, comprising:

transmitting a send signal with at least one of data and signalling information over a transmission channel among the radio channels for receipt as a received signal at a receiving station;

determining whether at least one interfering signal is present and where on the radio spectrum the interfering signal is located relative to the transmission channel by determining first and second signal-to-noise ratios of the received signal using narrow and wide receive band filtering, respectively, calculating a difference between the first and second signal-to-noise ratios, and comparing the difference with at least one threshold to conclude that there is interference from an adjacent channel if the difference is larger; and filtering out the at least one interfering signal using a receive filter.

2. A method in accordance with claim 1, further comprising transmitting a training sequence of a received burst to determine the signal-to-noise ratios.

3. A method in accordance with claim 2, wherein said filtering includes dimensioning an adaptive filter for filtering out the at least one interfering signal of at least one adjacent channel based on strength of detected interference.

4. A method in accordance with claim 3, further comprising determining at least one of energy strength of the at least one interfering signal and a signal-to-noise ratio in at least one adjacent channel as a measure the strength of interference on the received signal.

5. A method in accordance with claim 4, wherein a plurality of thresholds are used based on a range of the strength of the interference, and wherein each threshold is assigned a different filter characteristic for filtering out interfering signals.

6. A method in accordance with claim 5, further comprising signal processing of a filtered signal output by the receive filter in the receiving station to reverse at least one part of an effect of said filtering.

7. A method in accordance with claim 6, wherein said signal processing uses at least one of an inversion filter and a widening filter to reverse the effect of said filtering.

8. A method in accordance with claim 7, further comprising applying a Gauss-Seidel procedure for optimizing a target function of the widening filter.

9. A method in accordance with claim 8, further comprising additional filtering after said signal processing.

10. A method in accordance with claim 9, wherein said additional filtering includes adaptive filtering depending on recorded adjacent channel interference.

11. A method in accordance with claim 10, further comprising outputting at least one signal as an EDGE signal from the receiving station.

12. An adaptive filter in a receiving station for filtering a received signal obtained from a radio signal transmitted over a transmission channel in a radio communication system with at least one temporarily transmitting station and at least one receiving station which communicate with each other at corresponding times via a radio interface having a radio spectrum of radio channels, each having a restricted bandwidth, comprising:

at least one band filter to perform narrow and wide receive band filtering on the received signal;

a processor determining whether at least one interfering signal is present and where on the radio spectrum the interfering signal is located relative to the transmission channel by determining first and second signal-to-noise ratios of the received signal based on the narrow and wide receive band filtering, respectively, calculating a difference between the first and second signal-to-noise ratios, and comparing the difference with at least one threshold to conclude that there is interference from an adjacent channel if the difference is larger; and a receive filter filtering out the at least one interfering signal.

13. An adaptive filter in accordance with claim 12, wherein the received signal is a GMSK signal, and wherein said adaptive filter further comprises an additional filter with a first filter stage producing an intermediate signal with at least part of an effect of a previously applied filter removed and a second filter stage filtering the intermediate signal to create an EDGE signal from the GMSK signal.

14. An adaptive filter in accordance with claim 13, wherein the adaptive filter is installed in a radio station and the additional filter has a filter input tapping a line behind an output of a signal filter of the radio station.

* * * * *